United States Patent [19]

Webb

[11] Patent Number: 4,822,129

[45] Date of Patent: Apr. 18, 1989

[54] METHOD OF MOUNTING FERRULE TO EXPANDED BEAM LENS

[75] Inventor: Thomas W. Webb, Horseheads, N.Y.

[73] Assignee: Corning Glass Works, Corning, N.Y.

[21] Appl. No.: 140,573

[22] Filed: Jan. 4, 1988

[51] Int. Cl.$^4$ ................................................ G02B 6/32
[52] U.S. Cl. ............................... 350/96.18; 350/96.2; 350/320
[58] Field of Search ............... 350/96.15, 96.18, 96.20, 350/96.21, 320

[56] References Cited

U.S. PATENT DOCUMENTS 4,616,899  10/1986  Schlafer ........................... 350/96.18

FOREIGN PATENT DOCUMENTS 0236712  9/1987  European Pat. Off. ......... 350/96.21

Primary Examiner—John D. Lee
Assistant Examiner—John Ngo
Attorney, Agent, or Firm—William J. Simmons, Jr.

[57] ABSTRACT

The present invention relates to a method of attaching an optical fiber alignment ferrule to a connector body, the first end of which is lens-shaped. The body has an indented region in the second end thereof opposite the lens, the indented region being centered on the optical axis of the lens. The body is mounted in a cavity in an alignment fixture which also includes a bore that is aligned with the cavity. The bore is so positioned that when a connector body is mounted in the cavity, the axis of the bore is coaxial with the optical axis of the lens. A rigid alignment rod is slidably mounted in the bore so that the rod is capable of only longitudinal movement along its axis. One end of the rod is inserted through the hole in a tubular ferrule. The rod is advanced toward the connector body until the rod contacts the bottom of the indented region. The ferrule is moved along the rod until it contacts the second surface of the body. The ferrule is then bonded to the body.

18 Claims, 1 Drawing Sheet

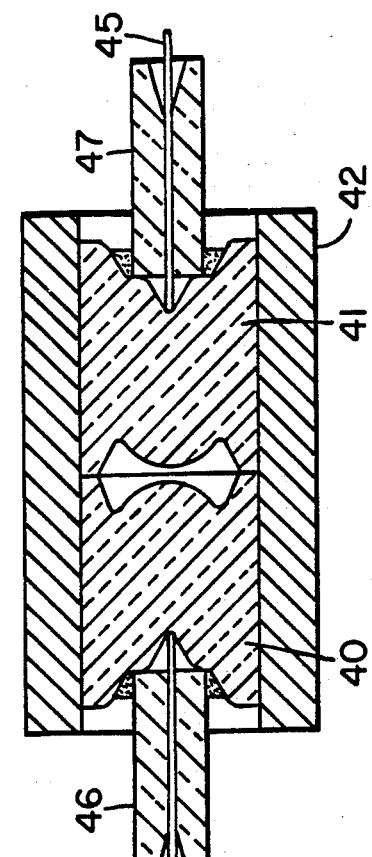
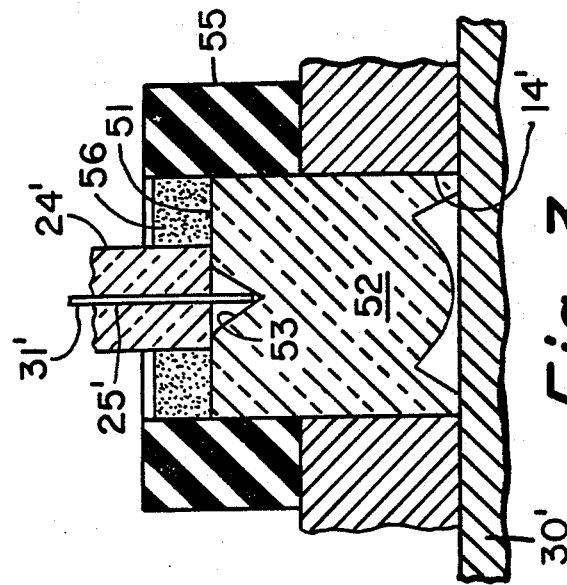
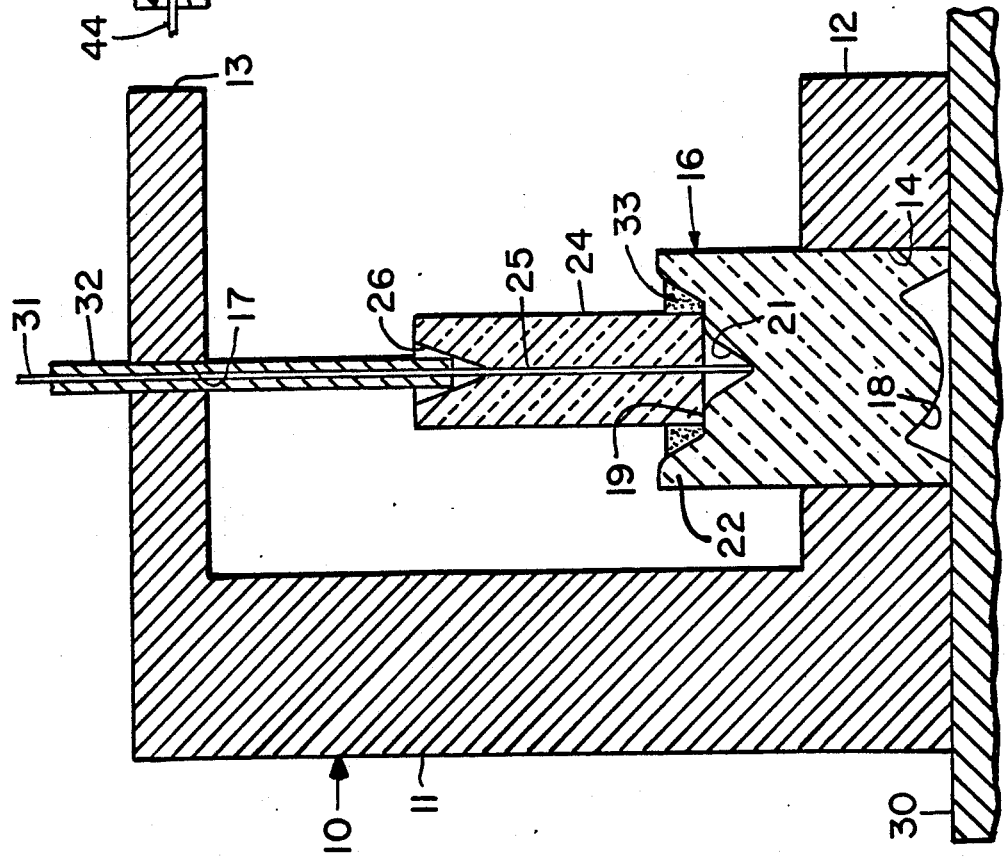

METHOD OF MOUNTING FERRULE TO EXPANDED BEAM LENS

BACKGROUND OF THE INVENTION

1. Field of the Invention

This invention relates to a method of making an optical component to which an optical fiber can be readily attached in proper axial alignment. More specifically, it relates to a method of attaching a fiber alignment ferrule to an expanded beam lens.

Although the present invention also finds utility in devices which couple light from a source to an optical fiber, the present discussion concerning connector alignment problems will be limited to fiber-to-fiber connectors. The butt connection between the ends of two fibers results in an insertion loss that is caused by various optical fiber misalignment parameters, examples of which are as follows: (a) lateral misalignment between the axes of the two fibers, (b) longitudinal misalignment between the endfaces of the two fibers, and (c) angular misalignment between the axes of the two fibers.

The simplest approach to fiber coupling is the butted end coupler in which fibers which have had their endfaces prepared are brought into angular, lateral and axial alignment. Such alignment is difficult to achieve outside the laboratory. Since the butted fiber arrangement is particularly sensitive to lateral displacement, this type of connector is difficult to use in field applications.

Beam expanders employing lenses or tapered fibers have been employed in in-line single-mode fiber connectors which, due to the small core diameter of such fibers, are extremely sensitive to lateral misalignment. Although such beam expanders exhibit a reduced sensitivity to lateral displacement, they are generally very sensitive to angular misalignment. Thus, various alignment mechanisms have been employed for the purpose of angularly aligning a fiber along the optical axis of the beam expanding optical element.

2. Description of the Prior Art

Disclosed in U.S. Pat. No. 4,531,810 (Carlsen) is a plastic optical connector body part having a lens molded in one end thereof and at the opposite end a cylindrical cavity which is centered on the optical axis. An elastomeric fiber holder or ferrule fits within the cavity and frictionally engages the wall thereof. The ferrule has an axial hole for supporting the optical fiber. A fiber is inserted into the ferrule hole so that the end thereof contacts the body part opposite the lens. If the ferrule hole were concentric with the outer cylindrical surface thereof, light radiating from the fiber would be collimated by the lens into a beam which propagates along the optical axis of the connector. However, when a fiber is positioned adjacent the connector body part in the manner described in the Carlsen patent, the fiber endface often deviates from the optical axis of the lens, and/or there is angular misalignment between the fiber axis and the lens optical axis.

U.S. Pat. No. 4,290,667 (Chown) discloses a method of actively aligning a capillary tube ferrule to a plastic lens. A lens body part is formed with a small diameter cavity at one end for receiving a lens and a coaxial, larger diameter hole at the other end. A glass capillary tube, mounted in a chuck of a micropositioner arrangement, is inserted into the large diameter cavity until it abuts the rear surface of the lens. A droplet of refractive index matching cement is placed between the capillary tube and the lens. An optical fiber is inserted down the bore of the chuck so that the end thereof enters the capillary tube. A beam of collimated light from a laser located on the optical axis of the lens is focused to a point near the fiber end. The micropositioner is employed to adjust the axial and longitudinal position of the fiber end to obtain maximum light transmission as indicated by a detector disposed at the remote end of the fiber. The joint is held steady until the cement has set. This method of aligning the capillary tube is time consuming and expensive.

SUMMARY OF THE INVENTION

It is therefore an object of the invention to provide a an improved method of aligning a fiber retaining ferrule to the back surface of a lens. Another object is to provide a ferrule alignment method that is faster and less expensive than methods requiring the use of micropositioners. Yet another object is to provide a method of affixing to a lens a fiber alignment ferrule, the longitudinal hole of which is not necessarily concentric with the outer cylindrical surface thereof. A further object is to provide a simplified lens-ferrule combination.

Briefly, the present invention relates to a method of attaching an optical fiber alignment ferrule to a connector body having an optical device such as a lens at a first end thereof and a second end opposite the first end. The body has an indented region in the second end thereof, the indented region being centered on the optical axis of the optical device, the remainder of the body other than the first and second surfaces having a predetermined shape. The body is mounted in a predetermined position. A rigid alignment rod is mounted in a slidable mounting means so that the rod is capable of only longitudinal movement along its axis, the slidable mounting means being so located that that portion of the rod within the slidable mounting means is coaxial with the optical axis of the optical device. There is provided an elongated ferrule having a hole extending longitudinally therethrough, the inside diameter of the hole being slightly larger than the outside diameter the rod. One end of the rod is inserted through the hole in the ferrule. The rod is advanced toward the connector body until the rod contacts the bottom of the indented region. The ferrule is positioned so that one end thereof is in contact with the second surface. The ferrule is then bonded to the second surface.

The step of mounting the rigid alignment rod may comprise providing a sleeve, inserting the rod into the sleeve, and inserting the combination of the rod and sleeve into the slidable alignment means. The ferrule can be positioned in contact with the body by moving the sleeve into contact with the ferrule and further moving the sleeve toward the body to urge the ferrule against the body. The remainder of the body may be cylindrical in shape, whereby the step of mounting the body causes that portion of the rod that is located within the slidable alignment means to become coaxial with the cylindrical surface.

The end of the body may includes an annular collar. The step of bonding then comprises inserting bonding material between the collar and the ferrule.

A sleeve can be placed around that portion of the remainder of the body at the second end thereof such that a portion of the sleeve extends beyond the second end, the inner surface of the sleeve being resistant to bonding to the bonding material. The step of bonding comprises inserting bonding material between the sleeve and the ferrule. The method further comprises the step of removing the sleeve from the body.

BRIEF DESCRIPTION OF THE DRAWINGS

FIG. 1 illustrates a method of using an alignment fixture to attach a ferrule to a lens.

FIG. 2 is a cross-sectional view of an expanded beam coupler employing two coupler body lenses formed by the method illustrated in FIG. 1.

FIG. 3 illustrates a modified ferrule alignment method.

DESCRIPTION OF THE PREFERRED EMBODIMENTS

The method of the present invention employs an alignment fixture 10 of the type shown in FIG. 1. Fixture 10 comprises a connecting section 11 from which arms 12 and 13 extend. Arm 12 is provided with a bore or cavity 14 which is just large enough to receive the circumferential surface of connector body 16. A precision bore 17 is formed in arm 13.

Connector body 16 can be inexpensively formed from plastic or glass by molding techniques. A first end 18 of body 16 has a lens-shaped surface. Second end 19 has a conically-shaped cavity or V-indent 21, the small diameter end of which lies on the optical axis of the lens formed by surface 18. When body 16 is mounted in fixture 10, the longitudinal axis of bore 17 is also aligned with the optical axis of the lens. End 19 is provided with a circumferential collar 22 which can be used for retaining bonding material such as epoxy. Since the inner surface of collar 22 is not used for aligning ferrule 24, it can have an inwardly-tapering shape which is more easily formed by glass molding techniques.

Fiber-retaining ferrule 24 may comprise a section of capillary tubing having a longitudinally-extending hole 25 with a conical flare 26 at one end to facilitate insertion of a fiber. The axes of hole 25 and the outer cylindrical surface of tube 24 are not necessarily coaxial, a characteristic which has rendered unreliable conventional ferrule attachment methods that use the outer surface of the ferrule for alignment purposes.

In accordance with the present invention, ferrule hole 25 is held in axial alignment with the lens optical axis while the ferrule is attached to body 16. This is accomplished in the following manner. A rigid alignment sleeve 32 is inserted into bore 17. One end of alignment rod 31 is inserted into ferrule 24, and the other end of the rod is inserted through sleeve 32. A small amount of index-matching fluid is placed in the V-indent 21 of body 16 which is then inserted through the bottom of cavity 14 with its second end 19 facing bore 17. A stop may be employed to keep the lens in cavity 14. For example, fixture 10 may be positioned on a table 30 such that the first end of body 16 rests on the upper surface thereof. Rod 31 is moved toward body 16 where it enters V-indent 21 and moves to the bottom thereof, thus positioning the rod end on the lens optical axis. Since rod 31 is centered in bore 17, the end of the rod remote from the V-indent is substantially centered on the lens optical axis. With ferrule 24 thus properly aligned, it is moved into contact with body 16, and bonding material 33 is placed within collar 22 to rigidly attach ferrule 24 to body 16.

When fixture 10 is oriented such that ferrule 24 is located above body 16, the weight of ferrule 24 is usually sufficient to form a seal between the ferrule and body that prevents bonding material from seeping into indent 21 where it could bond rod 31 to body 16. If fixture 10 is disposed in any other orientation, it may be necessary to urge ferrule 24 toward body 16 to effect such a seal. This can be accomplished by urging sleeve 32 toward the ferrule so that the ferrule is forced against body 16. After the bonding material has been dried or cured, the connector body-ferrule combination can be removed from the alignment fixture, and rod 31 can be removed from the ferrule.

Angular alignment of the ferrule is assured by the location of bore 17. Since bore 17 is located remote from second end 19 of body 16, a bore can be machined in fixture arm 13 with sufficient precision to limit the angle that rod 31 deviates from the optical axis as it extends from V-indent 21. The lateral precision with which the V-indent can be formed in body 16 assures lateral alignment of the rod and thus the ferrule to the lens. Since rod 31 extends through the ferrule hole, no special relationship is required between the outer surface of the ferrule and the axis of the hole thereof.

In a specific embodiment, arms 12 and 13 were separated by 2.54 cm, and the thicknesses of arms 12 and 13 were 0.64 cm and 0.32 cm, respectively. Cavity 14 had a diameter of 1.0 cm +0.001, −0.000, and bore 17 had a diameter of 0.5 mm ±0.013 mm. Sleeve 32 was a 2 cm long section of 25 gauge hypodermic tubing which fit snugly but slidably in bore 17. Rod 31 was a #100 drill rod, the diameter of which was 0.127 mm. Body 16 was a 1.2 cm long molded glass expanded beam lens having an outside diameter of 0.99 cm. Ferrule 24 was a 6 mm long piece of glass capillary tubing having an outside diameter of 2.5 mm. The diameter of hole 25 was 0.127 mm. After the ferrule and body were aligned in fixture 10 as shown in FIG. 1, Devcon brand five minute adhesive was applied to the region within collar 22 and was allowed to dry to complete the assembly.

Connector body-ferrule combinations of the type described above can be used to couple light between a fiber and a source, a detector or another fiber, the latter arrangement being illustrated in FIG. 2. In the illustrated connector, two connector bodies 40 and 41 are mounted in coupling tube 42. Multimode optical fibers 44 and 45 having outside diameters of 125 microns were inserted into ferrules 46 and 47, respectively, the fiber ends contacting the bottom of the V-indents, which had previously been provided with index matching fluid. A permanent connection can be made by replacing the index matching fluid with an index matching glue. The lowest attenuation achieved for a connector of the type shown in FIG. 2 was 0.7 dB. It is expected that it will be possible, by employing the above-described method, to routinely make couplers having attenuations of about 1 dB.

Since collar 22 is not needed for alignment purposes, the connector body may be formed without such a collar, thus simplifying the molding process. As shown in FIG. 3, wherein elements similar to those of FIG. 1 are represented by primed reference numerals, the second surface 51 of body 52 is provided with only a V-indent 53. Before ferrule 24' is positioned adjacent surface 51, sleeve 55 is placed over the second end of body 52 to form along with ferrule 24' and surface 51 a cavity for receiving bonding material 56. After the bonding material has been applied and has been hardened, body 52 is removed through the bottom of bore 14'. To prevent bonding material 56 from adhering to sleeve 55, either the entire sleeve or the inner surface thereof is formed of a material such as a non-stick synthetic resin polymer. The resultant device comprises a connector body 52. and a ferrule 24' attached thereto by a cylindrical collar 56 of bonding material, the outer, cylindrical surface of which is flush with the outer surface of body 52.

Although the sleeve 32 is useful for urging ferrule 25 toward body 16, it is not a necessity. If bore 17 were small enough that rod 31 fit snugly but slidably therein, rod 31 could still provide angular alignment for the ferrule. If the alignment fixture were vertically oriented, as illustrated in FIG. 1, the weight of the ferrule would cause it to fall onto end 19. If necessary, ferrule 24 could be grasped by hand or with a tool to urge it against end 19.

The apparatus of FIG. 1 could also be modified by utilizing two telescoping sleeves rather than the single sleeve 32. The outer sleeve would fit snugly in bore 17, and the inner sleeve would fit slidably within the outer sleeve. Rod 31 would be inserted into the inner sleeve.

Although the method of the present invention has been specifically described in conjunction with convex beam expanding lenses, it is also applicable to other types of beam modifying devices such as the tapered beam expander described in the publication, K. P. Jedrzejewski et al. "Tapered-Beam Expander for Single-Mode Optical-Fiber Gap Devices", *Electronics Letters*, Jan. 16, 1986, vol. 22, No. 2, pp. 105–106. The large end of the connector half must be provided with an axial indent by etching, drilling, or the like. The cylindrical, large diameter end is placed in a fixture cavity and a ferrule is attached as described above.

I claim:

1. A method of attaching an optical fiber alignment ferrule to a connector body comprising
   providing a connector body having an optical device at a first end thereof and a second end opposite said first end, an indented region in the second end of said body, said indented region being centered on the optical axis of said optical device, the remainder of said body other than said first and second ends having a predetermined shape,
   mounting said body in a predetermined position,
   mounting a rigid alignment rod in a slidable mounting means so that said rod is capable of only longitudinal movement along its axis, said slidable mounting means being so located that that portion of said rod within said slidable mounting means is coaxial with the optical axis of said optical device,
   providing an elongated ferrule having a hole extending longitudinally therethrough, the inside diameter of said hole being sufficiently large for said rod to pass therethrough,
   inserting one end of said rod through the hole in said ferrule,
   advancing said rod toward said connector body until said rod contacts the bottom of said indented region,
   positioning said ferrule so that one end thereof is in contact with said second end, and
   bonding said ferrule to said second end.

2. A method in accordance with claim 1 wherein the step of mounting a rigid alignment rod comprises providing a sleeve, inserting said rod into said sleeve, and inserting the combination of said rod and sleeve into said slidable mounting means.

3. A method in accordance with claim 2 wherein the step of positioning said ferrule comprises moving said sleeve into contact with said ferrule, and further moving said sleeve toward said body to urge said ferrule against said body.

4. A method in accordance with claim 1 wherein the remainder of said body is cylindrical in shape and wherein the step of mounting said body causes that portion of said rod that is located within said slidable mounting means to become coaxial with said cylindrical surface.

5. A method in accordance with claim 1 wherein the second end of said body includes an annular collar and wherein the step of bonding comprises inserting bonding material between said collar and said ferrule.

6. A method in accordance with claim 1 further comprising the step of placing a sleeve around that portion of the remainder of said body at the second end thereof such that a portion of said sleeve extends beyond said second end, the inner surface of said sleeve being resistant to bonding to said bonding material, and wherein the step of bonding comprises inserting bonding material between said sleeve and said ferrule, said method further comprising the step of removing said sleeve from said body.

7. A method of attaching an optical fiber alignment ferrule to a connector body comprising
   providing a connector body having a lens-shaped surface at a first end thereof and a second end opposite said first end, an indented region in the second end of said body, said indented region being centered on the optical axis of said lens-shaped surface, the remainder of said body other than said first and second ends having a predetermined shape,
   providing a fixture having a cavity for receiving said predetermined shape of said body and a bore aligned with said cavity, said bore being so positioned that when a connector body is mounted in said cavity, the longitudinal axis of said bore is coaxial with the optical axis of said lens-shaped surface,
   inserting a rigid alignment rod through said bore such that said rod is coaxial with said bore,
   providing an elongated ferrule having a hole extending longitudinally therethrough, the inside diameter of said hole being sufficiently large that said rod can pass therethrough,
   inserting said rod through the hole in said ferrule,
   inserting said connector body into said cavity with the second end thereof facing said bore,
   advancing said rod toward said connector body until said rod contacts the bottom of said indented region,
   positioning said ferrule so that one end thereof is in contact with said second end surface, and
   bonding said ferrule to said second end surface, 8. A method in accordance with claim 7 wherein the step of inserting said rod into said bore comprises providing a sleeve, inserting said rod into said sleeve, and inserting the combination of said rod and sleeve into said bore.

9. A method in accordance with claim 8 wherein the step of positioning said ferrule comprises moving said sleeve into contact with said ferrule, and further moving said sleeve toward said body to urge said ferrule against said body.

10. A method in accordance with claim 7 wherein the remainder of said body is cylindrical in shape and wherein the step of inserting said body into said cavity causes said bore to become coaxial with said cylindrical surface.

11. A method in accordance with claim 7 wherein the second end of said body includes an annular collar and wherein the step of bonding comprises inserting bonding material between said collar and said ferrule.

12. A method in accordance with claim 7 further comprising the step of placing a sleeve around that portion of the remainder of said body at the second end thereof which extends beyond said fixture toward said bore, a portion of said sleeve extending beyond said second end, the inner surface of said sleeve being resistant to bonding to a bonding material, and wherein the step of bonding comprises inserting said bonding material between said sleeve and said ferrule, said method further comprising the step of removing said sleeve from said body.

13. A method of attaching an optical fiber alignment ferrule to an optical device comprising providing an optical device having first and second ends, an indented region in the second end of said optical device, said indented region being centered on the optical axis of said optical device, mounting said optical device in a predetermined position, mounting a rigid alignment rod in a slidable mounting means so that said rod is capable of only longitudinal movement along its axis, said slidable mounting means being so located that that portion of said rod within said slidable mounting means is coaxial with the optical axis of said optical device, providing an elongated ferrule having a hole extending longitudinally therethrough, the inside diameter of said hole being sufficiently large for said rod to pass therethrough, inserting one end of said rod through the hole in said ferrule, advancing said rod toward said optical device until said rod contacts the bottom of said indented region, positioning said ferrule so that one end thereof is in contact with said second end, and bonding said ferrule to said second end.

14. A method in accordance with claim 13 wherein the step of mounting a rigid alignment rod comprises providing a sleeve, inserting said rod into said sleeve, and inserting the combination of said rod and sleeve into said slidable mounting means.

15. A method in accordance with claim 14 wherein the step of positioning said ferrule comprises moving said sleeve into contact with said ferrule, and further moving said sleeve toward said optical device to urge said ferrule against said optical device.

16. A method in accordance with claim 13 wherein the remainder of said optical device is cylindrical in shape and wherein the step of mounting said optical device causes that portion of said rod that is located within said slidable mounting means to become coaxial with said cylindrical surface.

17. A method in accordance with claim 13 wherein the second end of said optical device includes an annular collar and wherein the step of bonding comprises inserting bonding material between said collar and said ferrule.

18. A method in accordance with claim 13 further comprising the step of placing a sleeve around that portion of the remainder of said optical device at the second end thereof such that a portion of said sleeve extends beyond said second end, the inner surface of said sleeve being resistant to bonding to a bonding material, and wherein the step of bonding comprises inserting said bonding material between said sleeve and said ferrule, said method further comprising the step of removing said sleeve from said optical device.

* * * * *